United States Patent

Stevens

(10) Patent No.: US 9,154,499 B2
(45) Date of Patent: Oct. 6, 2015

(54) OFFLINE DATA DELETE WITH FALSE TRIGGER PROTECTION

(75) Inventor: Jon Stevens, Vancouver (CA)

(73) Assignee: Absolute Software Corporation, Vancouver (CA)

( * ) Notice: Subject to any disclaimer, the term of this patent is extended or adjusted under 35 U.S.C. 154(b) by 1220 days.

(21) Appl. No.: 12/129,568

(22) Filed: May 29, 2008

(65) Prior Publication Data

US 2008/0301820 A1 Dec. 4, 2008

Related U.S. Application Data

(60) Provisional application No. 60/932,058, filed on May 29, 2007.

(51) Int. Cl.
G06F 7/04 (2006.01)
H04L 29/06 (2006.01)
G06F 21/88 (2013.01)

(52) U.S. Cl.
CPC ............ H04L 63/0846 (2013.01); G06F 21/88 (2013.01)

(58) Field of Classification Search
CPC ........................... H04L 63/0846; G06F 21/88
USPC .................................................. 726/2, 26–28
See application file for complete search history.

(56) References Cited

U.S. PATENT DOCUMENTS

| 5,388,156 | A | 2/1995 | Blackledge, Jr. |
| 5,406,261 | A | 4/1995 | Glenn |
| 5,748,084 | A | 5/1998 | Isikoff |
| 6,087,937 | A | 7/2000 | McCarthy |
| 6,418,533 | B2 | 7/2002 | Angelo et al. |
| 6,480,096 | B1 | 11/2002 | Gutman |
| 6,518,874 | B2 | 2/2003 | Barrus |
| 6,725,382 | B1 | 4/2004 | Thompson et al. |
| 7,024,698 | B2 | 4/2006 | Tanaka |
| 7,665,146 | B2 * | 2/2010 | Munje et al. .................... 726/28 |
| 2005/0248543 | A1 | 11/2005 | North et al. |
| 2006/0021005 | A1 | 1/2006 | Williams |
| 2006/0021006 | A1 | 1/2006 | Rensin |
| 2006/0021007 | A1 | 1/2006 | Rensin |
| 2006/0132307 | A1 | 6/2006 | Velhal |
| 2006/0234679 | A1 | 10/2006 | Matsumoto |

(Continued)

OTHER PUBLICATIONS

Data Defense™, a White Paper, © 2006 Iron Mountain Incorporated, Boston, Mass., pp. 1-17.

(Continued)

Primary Examiner — Teshome Hailu
(74) Attorney, Agent, or Firm — Knobbe, Martens, Olson & Bear, LLP

(57) ABSTRACT

Systems and methods for protecting data stored on an electronic device from access by an illegitimate user are presented. The data is protected by activating an offline data delete module installed in the electronic device to conditionally delete the data according to the following criteria: after establishing a first communication between an agent installed in the electronic device and a remote server, obtaining a password from a user if a second communication is not established between the agent and the remote server within a predetermined period of time. After obtaining a password from the user, deleting at least some data stored on the electronic device after a second communication is not established between the agent and the remote server within the predetermined period of time and a predetermined number of incorrect passwords has been obtained.

19 Claims, 8 Drawing Sheets

(56) References Cited

U.S. PATENT DOCUMENTS

2006/0238802 A1    10/2006  Hanay
2006/0272020 A1    11/2006  Gardner
2007/0234427 A1    10/2007  Gardner
2009/0260088 A1*   10/2009  Quach ............................. 726/26
2009/0328186 A1*   12/2009  Pollutro et al. ................. 726/13
2011/0004941 A1*    1/2011  Mendez et al. ................ 726/26

OTHER PUBLICATIONS

PCT/CA2008/001136, PCT International Search Report, Oct. 7, 2008.

International Preliminary Report on Patentability dated Oct. 7, 2009 in counterpart PCT application No. PCT/CA2008/001136.

* cited by examiner

View Offline Data Delete Policies Summary

| Policy Name | Changed By | Changed Date | Active ESNs |
|---|---|---|---|
| Sales PCs | jstevens | 12/5/2005 14:53 | 132 |
| Marketing PCs | jstevens | 12/5/2005 15:01 | 21 |

Customer Center – Setup/Manage Offline Data Delete Policy

Step 1. Define the Offline Data Delete Policy And Warnings

Policy Name: [          ]   Description: [                              ]

☑ Trigger: No Internet Connection - Days Since Last Agent Call

| ☑ Display Coded Warning Message After [7] Days | Provide a message that alerts a legitimate end user that Data Delete is imminent but doesn't tip off a thief<br>Message: [Error code 52 – Please contact the help desk immediately ] |
|---|---|

| ⊙ Lockout User With PreBoot Password After [9] Days<br>OR<br>○ Launch Delete Without Lockout After [ ] Days | Pre-Boot Password Configuration<br>Enter a case sensitive pre-boot password to lock out a thief. If this is wrongly input X times, Data Delete will be launched.<br>Prompt: [Enter Authentication Code ] Password: [StrongPwd;1234 ]<br>○ If Password Wrong, Leave User Locked Out<br>⊙ If Password Wrong, Boot And Launch Data<br>Launch Delete After [4] Consecutive Attempts |
|---|---|

☑ Trigger: Invalid Windows Login       ☑ Place Emergency Disable Utility On The Client

| Launch Delete After [ 5] Consecutive Invalid Logins |
|---|

Define Data Delete Type

| ○ All Files Except O/S<br>⊙ Specific Files/Types/Folders |
|---|
| Company-Wide Policy<br>->Sales Computers<br>Marketing Computers |

This utility, disableoffline.exe, will be placed in the C:\Windows\System32 folder on the client and can be used to disable Offline Data Delete in an emergency when there's no internet connection and the CT Agent can't call. The end user should run the utility and enter the password below to temprearily disable the Offline Deletion policy.

Password: [StrongPwd;5678             ]

Step 2. Apply Policy To Or Revoke Policy From A Set Of Computers

| Add Computer | Add Computer Group | Remove Policy From Selected Computers |
|---|---|---|

*Logic note: Applying the policy to new computers or groups of computers refreshes the display but does not save the changes to the DB until the Save button is selected and the SecurId token value and CC Password validated*

| | Identifier/ESN | Make/Model | Serial Num | User | Policy Status | Last Call |
|---|---|---|---|---|---|---|
| ☑ | 1234567890abcdefghij | Dell Inspiron 4000 | JXEG-23567 | jstevens | Monitoring Triggers | 31 May 2006 12:05 PM |
| ☑ | 1234567890abcthjjkjk | Lenovo T42 | 4594642 | gglave | Set–Awaiting Call | 11 Jan 2007 13:07 PM |

Step 3. Accept The Offline Data Delete Authorization and Enter SecurId Token Value Governing Law. This Agreement will be governed and construed in accordance with the laws of the Province of British Columbia. The courts of the Province of British Columbia and Canada shall have exclusive jurisdiction of any legal proceeding regarding this Agreement, and the parties expressly submit to the jurisdiction of said courts.

☐ I Accept this agreement          Name     [                    ]

Phone No.  [            ]            Email     [                    ]

Re-Enter Customer Center Password   [**************]

Enter RSA SecurId Token Value       [123456       ]

| Save & Apply |   | Cancel |   | Disable Policy |
|---|---|---|---|---|

FIG. 10

Data Delete Summary — 160

Filter — Data Delete Status (161) — Data Delete Type (162)

Group [All ESNs] ▼
Field [Make] ▼
Is Value [ Dell ]

Requested Date Between
[yyyy/mm/dd] & [yyyy/mm/dd]

Completed Date Between
[yyyy/mm/dd] & [yyyy/mm/dd]

Data Delete Status:
- [x] Set-Awaiting Call
- [x] Launched
- [x] Monitoring Triggers
- [x] Complete
- [ ] Cancelled
- [ ] Failed Data Delete Type:
- [x] Online Deletion
- [x] Offline Deletion

[Create New Online Delete]  [Create New Offline Delete Policy]  [Show Results] — 165

| ESN | Make/Model | Serial No. | Requested | Last Call | Type | Offline Policy | Status | |
|---|---|---|---|---|---|---|---|---|
| XXXXXXXXXX | Dell Inspiron 4000 | JXEG-23567 | May 3 2007 | May 5 2007 | Offline | Offline-Sales | Monitoring Triggers | [Detail] |
| YYYYYYYYYY | Dell Latitude 2234 | DRGC-14678 | May 12 2007 | May 12 2007 | Online | N/A | Launched | [Detail] |
| ZZZZZZZZZZ | Dell Latitude 2234 | DRGC-37803 | May 12 2007 | Apr 15 2007 | Offline | Offline-Exec | Set-Awaiting Call | [Detail] |
| ZZZZZZZZZZ | Dell Inspiron 1500 | 4556-37803 | May 12 2007 | Apr 28 2007 | Online | N/A | Set-Awaiting Call | [Cancel] |

<<First    <Previous    Next>    Last>>

FIG. 11

Offline Data Delete Detail Screen

Selected Computer
ESN: XXXXXXXXXXXXXXXXXXXX
Make: Dell
Model: Inspiron 4000
Serial No: XZBY-3135
Asset No: TFE-2

Offline Data Delete Options
Policy: Sales Offline Deletion
No Internet Connection (Computrace Agent Call) Trigger: Yes
    Display Coded Message: Yes – After 7 Days
        Message: Error Code 52 – Please Contact the Help Desk
    Lockout User With Pre-Boot Password: Yes – After 9 Days
        Password Prompt: Enter Authentication Code
        Password: Strongpwd;1234
        Allowed Consecutive Attempts: 4
        If Password Wrong – Boot and Launch Data Delete
Invalid Windows Login Trigger: Yes
    Launch After 5 Consecutive Wrong Attempts
Data Delete Type: Specific Files/Folders
File/Folder Policy Name: Sales Computers
File/Directory List
    C:\My Documents
    *.doc
Emergency Disable Utility Sent: No

Authorized By
Name: Brian Garcia
Phone No: 1-987-654-3201
Email: bgarcia@xyzcompany.com
User Login: bgarcia

| Data Delete Status | Date/Time | User | Details |
|---|---|---|---|
| 1. Set, Awaiting Call | May 3, 2007 14:15 | bgarcia | |
| 2. Monitoring Triggers | May 3, 2007 18:23 | | |
| 3. Amended Awaiting Call | May 12, 2007 07:19 | bgarcia | |
| 4. Monitoring Triggers | May 13, 2007 07:56 | | |
| 5. Completed | July 5, 2007 09:12 | | |

[View Deletion Log]  [View Summary Page]

FIG. 12

OFFLINE DATA DELETE WITH FALSE TRIGGER PROTECTION

CROSS-REFERENCE TO RELATED APPLICATION

This application claims the benefit of U.S. Provisional Patent Application No. 60/932,058 filed May 29, 2007, priority from the filing date of which is claimed, and which is hereby fully incorporated by reference.

BACKGROUND

The claimed subject matter relates to the protection of proprietary or sensitive data stored on computing and other electronic devices by deletion thereof following the theft or loss of such a device.

Proprietary information is routinely stored on electronic devices such as personal computers, laptop computers and personal digital assistants, and the need to protect such proprietary or sensitive data from theft or misuse is self-evident. Accordingly, in addition to the use of basic encryption techniques and on-line monitoring systems, various systems and methods addressing the need to detect the tampering or theft of an electronic device without the device having to be connected to the internet have been proposed.

By way of example, U.S. Pat. No. 6,480,096 describes a method and apparatus for theft deterrence and secure data retrieval in a communication device. When a processor detects unauthorized use, it deletes an encryption key, transmits a stealth code to a base station and receives data into a secure memory location transparent to an unauthorized user of the communication device.

U.S. Pat. No. 5,748,084 describes a device security system. Tamper detection logic implemented in software or hardware responds to tampering or removal of a security beacon or other component by alerting via a transmitter and/or disabling functionality of the device.

U.S. Patent Applications Publication Nos. 2005/0216757 and 2006/0272020 describe a tamper resistant servicing agent for providing various services such as data delete upon receipt of an instruction transmitted via the internet from a monitoring center.

U.S. Patent Application Publication No. 2006/0021005 describes a system and method for data destruction stored on a lost portable electronic device. A client computing device communicates periodically with a server. If communication is not established between the client and the server for a selected activation interval and a subsequent grace period, data is determined to be lost, and programmed security rules, such as data deletion, are automatically executed.

Tamper detection logic may, however, trigger false alarms, as could the expiration of a grace period. There is therefore a further need to ensure that false alarms are not triggered accidentally, causing data to be unnecessarily deleted. Such a need would ideally be fulfilled without annoyance to and with no more than minimal effort from the user.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

This summary is not an extensive overview intended to delineate the scope of the subject matter that is described and claimed herein. The summary presents aspects of the subject matter in a simplified form to provide a basic understanding thereof, as a prelude to the detailed description that is presented below.

The subject matter described herein provides a system and method for the protection of data stored on an electronic device by conditional offline deletion thereof in a manner that ameliorates the risk of accidental deletion in cases such as where the device is temporarily lost, or where the device has simply been left unattended for an extended period of time. In accordance with the described subject matter, two conditions must be fulfilled before the data is deleted, namely: (1) the expiration of a predetermined period of time following the most recent connection of the device to a monitoring center, and (2) the entry of an incorrect password.

It will be noted that the requirement to fulfill only one of these conditions will not provide an adequate solution. For example, the simple expiration of a predetermined period of time may occur for genuine reasons, such as the user going on holiday, the user being ill, or simply through the user not using the electronic device for an extended period of time. It would not be sensible to delete data in these circumstances. Similarly, requiring only the input of a correct password would be an annoying feature, as its implementation would require a user to enter the password every time the electronic device is to be used. Accordingly, the deletion of data upon fulfillment of only one of these conditions on an either/or basis will not provide an adequate solution.

The solution is provided by configuring an offline data delete system such that certain data is deleted only if a predetermined period of time following the most recent connection to a monitoring center has expired and, in combination with this, one or more incorrect passwords is entered after such a period. Optionally, and configurable by an administrator, a warning message may be displayed periodically after a predetermined fraction of the predetermined period of time has elapsed. The data deletion preferably occurs in the background while otherwise normal operation of the electronic device is permitted. Normal operation of the device is also preferably permitted, without the further need of a password, after data deletion has been completed.

In a first embodiment of the claimed subject matter, an electronic device configured to protect the data stored thereon is provided. The device comprises a memory for the storage of data, an output interface, an input interface, an agent and an offline data delete module, said agent configured to communicate with a remote server and said offline data delete module configured to: (a) establish a first communication between an agent installed in the electronic device and a remote server; (b) obtain a password from a user if a second communication is not established between the agent and the remote server within a predetermined period of time for establishing a communication between the agent and the remote server; and (c) delete at least some data stored on the electronic device after a second communication is not established between the agent and the remote server within the predetermined period of time and a predetermined number of incorrect passwords has been obtained. In some embodiments, the offline data delete module is further configured to restart the measurement of the predetermined period of time if a second communication is established between the agent and the remote server before the expiration of the predetermined period of time and/or upon obtaining a correct password from the user.

In another embodiment, the claimed subject matter provides a method for protecting data stored on an electronic device in which an offline data delete module has been installed and activated. The method comprises the steps of: (a) establishing a first communication between an agent installed in the electronic device and a remote server; (b) obtaining a password from a user if a second communication is not established between the agent and the remote server within a predetermined period of time for establishing a communication between the agent and the remote server; and (c) deleting data stored on the electronic device after a second communication is not established between the agent and the remote server within the predetermined period of time and a predetermined number of incorrect passwords has been obtained. In some embodiments, the method also comprises restarting the measurement of the predetermined period of time if a second communication is established between the agent and the remote server before the expiration of the predetermined period of time, and/or upon obtaining a correct password from the user.

In other embodiments, the claimed subject matter provides a system for protecting data stored in an electronic device from unauthorized access. The system comprises a memory for the storage of at least some of the data, an output interface, and an input interface, an offline data delete module installed in the device, an agent installed in the device, and a server remote from the device. The agent is configured to communicate with the server, and the offline data delete module is configured to: (a) detect the elapse of a predetermined period of time since the agent last communicated with the server; (b) detect the input of a predetermined number of incorrect passwords by a user; and (c) delete at least some of the data upon the detection of (a) and then (b).

In yet further embodiments, a tangible computer-readable medium carrying computer-executable instructions is provided. When executed on an electronic device comprising a processor and a memory storing data to be protected from unauthorized access, the instructions carry out a method comprising: (a) establishing a first communication between an agent installed in the electronic device and a remote server; (b) obtaining a password from a user if a second communication is not established between the agent and the remote server within a predetermined period of time for establishing a communication between the agent and the remote server; and (c) deleting at least some data stored in the memory after a second communication is not established between the agent and the remote server within the predetermined period of time and a predetermined number of incorrect passwords has been obtained.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 10 is a screen shot for setting up and managing a data delete policy in accordance with embodiments of the disclosed subject matter.

FIG. 11 is a screen shot of a data delete summary in accordance with embodiments of the disclosed subject matter.

FIG. 12 is a screen shot of offline data delete details in accordance with embodiments of the disclosed subject matter.

DETAILED DESCRIPTION

Definitions

Terminology

Figure 1:
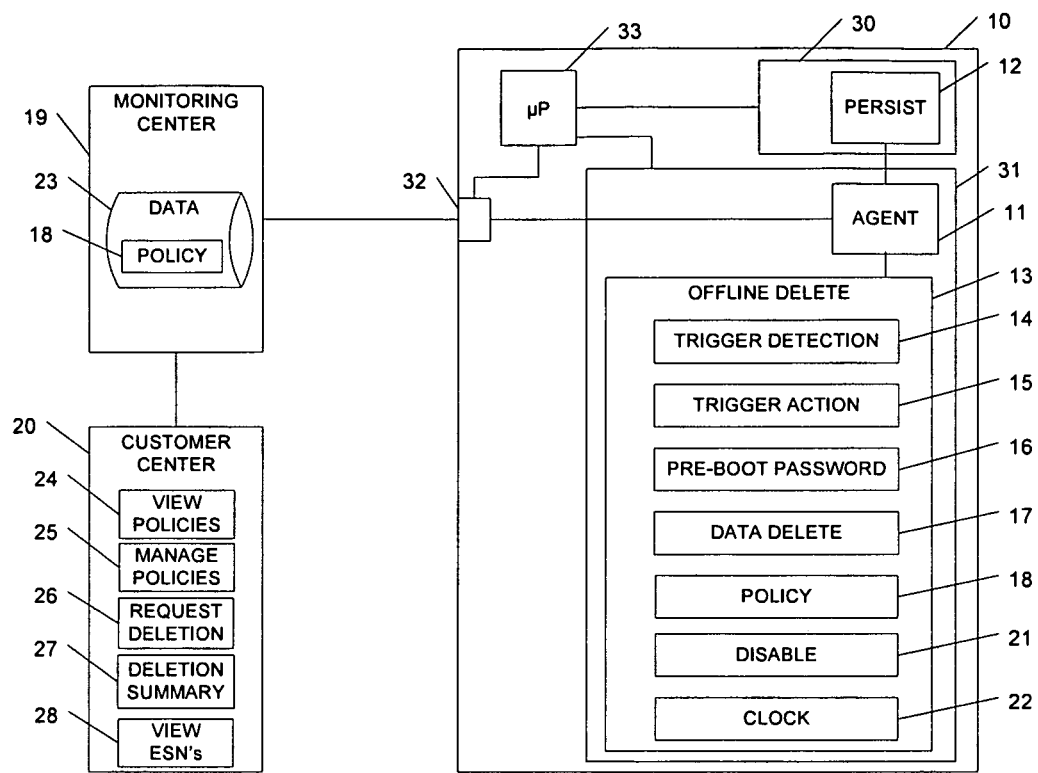
FIG. 1 is a schematic functional block diagram of an offline data delete system in accordance with embodiments of the disclosed subject matter.

Host—The term "host" refers herein to an electronic device carrying data that may conditionally be deleted. The host may be any electronic device with a memory (such as a laptop computer, a personal computer, a cell phone, a Blackberry®, an iPhone®, an iPod®, or a memory module) that can hold data that one might want to be deleted if the host is lost or stolen. The host can also be referred to as a "client", and more specifically as a client of a monitoring center. The host typically has an electronic serial number ("ESN") with which it can be identified, and the term "ESN" may be used instead of the term "host" to refer to the electronic device to be protected.

Agent—as used herein, is a software, hardware or firmware agent that is persistent and stealthy, and that resides in a computer or other electronic device. The agent provides servicing functions which require communication with a remote server. The agent is tamper resistant and is enabled for supporting and/or providing various services such as data delete, firewall protection, data encryption, location tracking, message notification, and software deployment and updates. An illustrative embodiment of an agent is found in the commercially available product Computrace Agent™. The technology underlying the Computrace Agent™ has been disclosed and patented in the U.S. and other countries, which patents had been commonly assigned to Absolute Software Corporation. See, for example, U.S. Pat. Nos. 5,715,174; 5,764,892; 5,802,280; 6,244,758; 6,269,392; 6,300,863; and 6,507,914; and related foreign patents. Details of the persistent function of the agent are disclosed in U.S. Patent Application Publication Nos. US2005/0216757 and US2006/0272020. All of these documents are fully incorporated by reference as if fully set forth herein. It is feasible to use an equivalent agent to the Computrace Agent™, or less preferably an alternative agent with less functionality. The minimal functional attributes of the agent are: (1) to communicate stealthily with a monitoring center; (2) to self-repair; and (3) to control in part the functioning of a computer or electronic device in which it is installed. Communications may be initiated by the agent, by the monitoring center or by both.

Monitoring Center—This is a guardian server or other computer or server that the agent communicates with or sends a message to. For example, provided an internet connection is available to the host, an agent may call the monitoring center once a day (or at some other selected suitable interval) to report the location of the host and download software upgrades if there are any. In the technology disclosed herein, the agent would upload to the monitoring center a log file of the files that have been deleted while the host was offline.

Customer Center—This is preferably a web-based interface through which a user may interact with the data delete system disclosed herein. At the customer center, a user may set up offline data delete policies, and given policy may be applied to one or more hosts. A policy may be changed or disabled. Triggers, such as time delays and the permissible number of password attempts may be set or changed. Also at the customer center, a list of the files deleted may be retrieved. Such a user may be the owner of a laptop computer or the IT administrator for a group of computers.

Offline Data Delete Module—This comprises the Trigger Detection Client (or Offline Trigger Monitor), Trigger Action Client, the Pre-Boot Password Prompt Client, the Data Delete Client and the offline data delete policy. These are the software components residing in the host and responsible for determining when data should be deleted after a theft has taken place and ensuring that the data deletion is carried out. Further included in the offline data delete module is a Clock Utility and a Disable Utility for locally disabling the offline data delete module.

Offline Data Delete System—This term refers to the disclosed technology as a whole, and comprises the offline data delete module, an agent, a monitoring center and a customer center.

Offline Data Delete—This means that the data deletion is initiated while the host device is not connected to the internet. Data deletion initiated this way may continue if the host is subsequently connected to the internet and the agent makes a call to the monitoring center.

Online Data Delete—This term refers to data deletion which is initiated when the host is connected to the internet and the agent is in communication with the monitoring center. In this case, the deletion of data may continue after the communication has been terminated.

User—This term is generally used to refer to the person who legitimately operates the host device.

Administrator—Refers to the person who interacts with the customer center. The administrator may be the same person as the user.

Customer—The person or entity which would normally own the host device and who would purchase the offline data delete system. The customer may also be the administrator and/or the user.

The detailed descriptions within are presented largely in terms of methods or processes, symbolic representations of operations, functionalities and features of the invention. These method descriptions and representations are the means used by those skilled in the art to most effectively convey the substance of their work to others skilled in the art. A software implemented method or process is here, and generally, conceived to be a self-consistent sequence of steps leading to a desired result. These steps require physical manipulations of physical quantities. Often, but not necessarily, these quantities take the form of electrical or magnetic signals capable of being stored, transferred, combined, compared, and otherwise manipulated. It will be further appreciated that the line between hardware, software and firmware is not always sharp, it being understood by those skilled in the art that software implemented processes may be embodied in hardware, firmware, or software, in the form of coded instructions such as in microcode and/or in stored programming instructions.

Exemplary Embodiment

A block diagram of a preferred embodiment of the offline data delete system is shown by way of example in FIG. 1. The system generally comprises an offline data delete module 13 within a host 10, a monitoring center 19 and a customer center 20. An administrator visits the online manage/setup page 25 of the customer center 20 and sets up an offline data delete policy 18 for the host 10 which is stored in the database 23 of the monitoring center 19.

By way of example, the host shown in FIG. 1 may be a laptop computer, though this is for illustrative purposes only. It should be appreciated, however, than a laptop computer is one of any number of electronic devices that may be configured according to aspects of the disclosed subject matter, including (but not limited to): tablet computers, personal computers, personal digital assistants (PDAs), wireless communication devices, and the like. Common to these electronic devices is a processor 33, a memory 31 (including persistent and/or volatile memory), and a network interface module 32.

The host 10 further comprises an agent 11 configured to communicate with monitoring center 19 via an internet connection (which may be wired, wireless or both, a cellular or wired telephone connection, or any other appropriate connection permitting communication) and a persistence module 12 configured to restore the agent 11 if it becomes damaged or deleted. The agent 11 is preferably, but not necessarily, stored on the hard drive 31 of the host 10, and the persistence module 12 is preferably, but not necessarily, stored in BIOS 30 of the host 10. The agent 11 in its normal course of operation communicates periodically via a network interface module 32 with the monitoring center 19, provided that a suitable communication connection is available. The monitoring center 19 is communicably connected to the customer center 20, and downloads the components of the offline data delete module 13, including a copy of the offline data delete policy 18, into the host 10. The agent 11 is also enabled, when communicating with the monitoring center 19, to download upgrades to the offline data delete module 13, to repair the offline data delete module, and in the case of a replacement hard drive being installed, to download the offline data delete module 13 to the new hard drive.

The agent 11 is operably connected to the offline data delete module 13. The offline data delete module 13 comprises a trigger detection client 14, which monitors the time elapsed, as counted by clock utility 22, since the agent 11 last communicated with the monitoring center 19. When the time elapsed has reached a predetermined duration, the trigger action client 15 causes certain events to occur. After an elapsed period of time (say, 7 days), such an event could be the periodic display of a warning message which directly or indirectly prompts the user to connect to the internet. Further, after another period of time (say, 3 days), as detected by the trigger detection client 14, trigger action client 15 may reboot the host 10 and require the pre-boot password client 16 to run. After a predetermined number of failed attempts to enter a correct password, as determined by trigger detection client 14, trigger action client 15 causes the data delete client 17 to start. Data delete client 17 consults stored data delete policy 18 and deletes the files in the host 10 that are specified by the data delete policy 18.

Operation of the offline data delete module 13 is ideally stealthy, such that it is not detected by illegitimate users, firewalls or anti-malware products, and does not, for example, show Vista® user account control prompts.

Data delete client 17 preferably includes a check which will ensure that it only operates if an agent 11 is present. This will help prevent it from being used maliciously as a virus. For additional protection against misuse, the data delete client 17 is preferably encoded to only run on a specific host 10. It could, for example, be encoded using the host's make model and serial number, or with an electronic serial number allocated to the host 10.

The offline data delete module 13 also optionally comprises a local disable utility 21, which allows a legitimate local user to disable the offline data delete module 13. The disablement is temporary and lasts until the following call the agent 11 makes to the monitoring center 13, unless in the interim the administrator has requested that the particular host 10 be removed from the data delete policy 18.

The agent 11 may comprise a separate module as shown in FIG. 1, or it may be contained within the offline data delete module 13.

The customer center 20 is accessed via a web interface. At the customer center 20, the administrator can view 24 offline data delete policies 18, which identify which files and/or folders are to be deleted should the offline data delete client 17 of the offline data delete module 13 be triggered. It is possible for an administrator to be responsible for a quantity of laptops (hosts 10) or other electronic devices each operated by a different user, with possibly different offline data delete policies 18 required for different subsets of the laptops. The administrator can setup, manage and amend policies 18 via a policy management facility 25 of the customer center 20. As an option, the administrator can make an online request for data deletion 26 in customer center 20. This request will be stored in the monitoring center 19 and passed to the agent 11 during a subsequent call to the monitoring center 19. Also at customer center 20, an administrator can see a summary and details 27 of files and/or folders that have been deleted, whether via an online data delete request 26 or via the offline triggering of the offline data delete client 17. The administrator may also view the status 28 of individual hosts 10 as identified by their ESN's or some other more meaningful names provided by the administrator.

The user of the host 10 may access the clock utility 22 which indicates the time left until intermittent message display, the time left until pre-boot password requirement, and the time left until data deletion.

The durations specified above are not fixed and can be changed by the administrator or can be set to different default values via the customer center 20. The number of failed password attempts to be permitted can also be set or changed by the administrator, as can the type of message, if any, presented by the customer center 20.

The customer center 20 may be operated from the same or a different server to that which the monitoring center 19 uses. The two centers may be in the same or in different geographic locations.

Functional Operation

Figure 2:
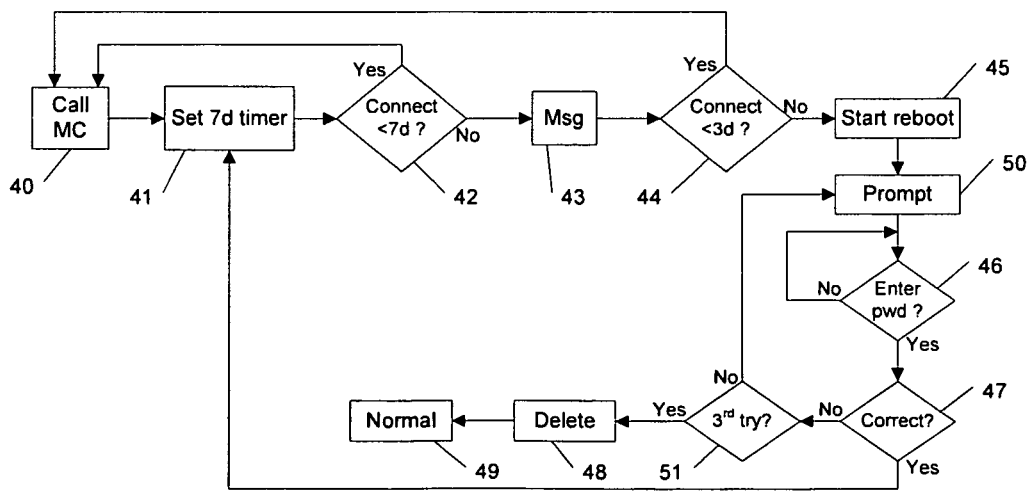
FIG. 2 is a functional flow diagram schematically representing the flow process experienced by an electronic device in accordance with embodiments of the disclosed subject matter.

FIG. 2 is a flow diagram of the functional operation of the offline data delete system of FIG. 1. Following installation of the offline data delete system, the agent 11 makes an initial communication 40 with the monitoring center 19, at which point (following or during the successful communication) the offline data delete module 13 initiates 41 the clock utility 22 to start counting time. Unless interrupted by a subsequent communication between agent 11 and monitoring center 19 (as is discussed further below), the overall period of time counted by clock utility 22 during any given cycle of the offline data delete system is the time from the most recent communication 40 (this can be the initial communication 40 or a subsequent communication 40) between agent 11 and monitoring center 19 and the time a pre-boot password is required (i.e. following step 45). In preferred embodiments, the overall time period is divided into a first fraction representing a primary period of time and a second fraction representing a secondary period of time.

The clock utility 22 initially counts the primary period of time, here indicated by way of example as a seven day period of time. It is to be noted that the clock utility 22 may be started during or after the communication is made between agent 11 and monitoring center 19. During this primary period of time, the status of the offline data delete module 13 is termed "Monitoring Triggers".

If an internet connection 42 between agent 11 and monitoring center 19 is made available at any point during the primary period of time (i.e. during the "Monitoring Triggers" phase), then agent 11 will again communicate 40 with monitoring center 19 and restart 41 the clock utility 22. Conversely, if an internet connection 42 between agent 11 and monitoring center 19 is not made available at any point during the primary period of time (i.e. during the "Monitoring Triggers" phase), then the trigger detection client 14 within the offline data delete module 13 detects the expiration of the primary period of time and causes the trigger action client 15 to take action during the secondary period of time. This action is represented in FIG. 2 as the generation of a message 43 on the display screen of the host 10.

The trigger action client 15 causes the display 43 on the host's display screen of a coded message during the secondary period of time, which directly or indirectly prompts the user to connect to the internet. For example, the message could read "Error 34—Please call the helpdesk". This message is preferably crafted so that it is meaningful to a legitimate user, but means nothing to a thief, so that the thief is not tipped off about the existence or operation of an offline data delete system. The message may be temporarily displayed at regular intervals (such as, for example, of two or three hours' duration), at random intervals, at decreasing intervals, at semi-random intervals, or at some other interval selected by an administrator.

The status of the offline data delete module 13 during the secondary period of time, as counted by clock utility 22, is termed "Warning Message". In the illustrated embodiment, the secondary period of time is a three day period.

If the host 10 is connected 44 to the internet within the second period of time, such that the agent 11 can make a successful call 40 to the monitoring center 19, the clock utility 22 re-initiates 41 the clock utility 22 to the beginning of the primary period of time. If the host 10 is not connected 44 to the internet and the agent 11 is unable to make a successful call 40 to the monitoring center 19 within the secondary period of time, the trigger detection client 14 within the offline data delete module 13 detects this and causes the trigger action client 15 to take further action. The action taken by trigger action client 15 at this point causes the host 10 to start a reboot 45 and the pre-boot password client 16 to come into play.

During the rebooting of the host 10, the legitimate user, or thief as the case may be, is prompted 50 to enter a password.

The status of the offline data delete module 13 is now "Pre-Boot Password". Note that for compatibility with full disk encryption software, it is preferable to request the pre-boot password client 16 after the full disk encryption password. If no password is entered 46, the host 10 stays as it is and does not continue with the booting process. If a password is entered 46, and if it is the correct password that is entered 47 the offline data delete module 13 resets the clock utility 22 such that the counting of the primary period of time restarts 41.

If an incorrect password is entered 47 a determination 51 is made as to the number of password entries 46 attempted. If the predetermined maximum number of attempts (in the illustrated embodiment, three attempts) has not been reached, the prompt 50 is displayed.

If the determination 51 is made that an incorrect password is entered 47 the predetermined number of times (here three times), the trigger detection client 14 detects this and causes the trigger action client 15 to take further action. At this point, the trigger action client 15 completes the boot and invokes the data delete client 17, which consults the data delete policy 18 within the offline data delete module 13 and then deletes 48 the files and/or folders specified by the policy 18. The status of the offline data delete module 13 is now "Launched Delete". The deletion takes place in the background and the host 10 otherwise operates normally, so as not to alert a thief to the action being taken.

A log file of the deleted files is created, which is excluded from the files to be deleted. After the deletion has completed, the status of the offline data delete module 13 becomes "Deleted—Awaiting Call". At the next connection to the internet, the agent 11 makes a call to the monitoring center 19 and uploads the log file, which can be viewed via the customer center 20. The log file is then removed from the host. The continued normal operation 49 of the host 10 following data deletion also allows for the agent 11 to make future calls to the monitoring center 19 whenever the host 10 is connected to the internet, which enables the host 10 to be monitored, tracked and then recovered by a law enforcement agency.

Once the offline data delete 48 has been launched as a result of the entry of a predetermined number of incorrect pre-boot passwords, a further re-booting of the host 10 does not cause a further pre-boot password prompt 50. The host 10 operates normally, as seen by the thief, with the data deletion continuing, if not already completed, in the background.

For additional security, the pre-boot password, the disable offline data delete password and the data delete policy 18 are preferably encrypted on the host and during communications with the server.

It will, of course, be understood that the time periods, the number of password attempts and the message in the above description may be altered according to the administrator's preferences. For example, the primary period of time may be 75 hours, 5 days, 9 days or some other duration. The secondary period of time could be 25 hours, 4 days or some other period. The interval between messages could be 20 minutes, 1 hour, 5 hours or some other duration.

The functioning of the offline data delete system and method is further illustrated by specific use-case examples of its different modes of operation, which follow below.

Use-Case: Creation of a Data Delete Policy

Figure 3:
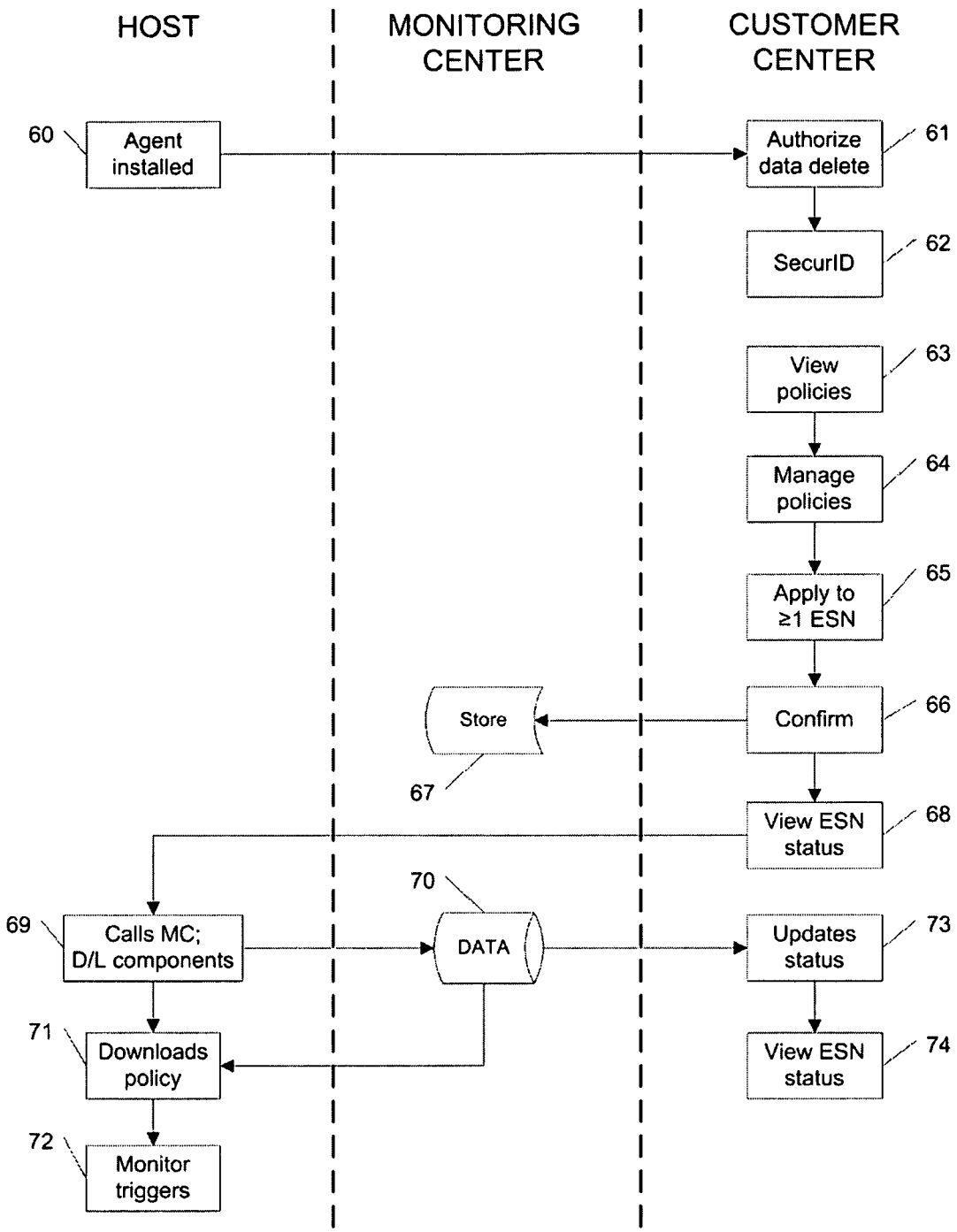
FIG. 3 is a use-case diagram showing creation of a data delete policy in accordance with embodiments of the disclosed subject matter.

FIG. 3 shows a swim lane diagram of the interaction between parts of the offline data delete system during the setup of an offline data delete policy 18. The parts of the system shown in this diagram are the host 10, the monitoring center 19 and the customer center 20.

In order to setup an offline data delete policy 18, the agent 11 must first be installed 60 in the host 10. Next, the customer visits the customer center 20 on the internet and fills in a form which pre-authorizes 61 the offline data delete and nominates an administrator. The administrator may be the customer or may be another person nominated by the customer. The user of the host device 10 may be another individual, or may be the customer or the administrator. The administrator receives a unique authorization token referred to as a SecurID™ 62, which allows logging onto and interaction with the customer center 20. A software equivalent or access password may be used instead of the token.

With the SecurID, the administrator logs onto the customer center 20 and goes 63 to the "View Policies" section 24, where the administrator may view any existing policies. The administrator then goes 64 to the "Manage Policies" section 25 to create a new offline data delete policy 18. This may involve providing a policy name, and involves specifying the files and/or folders to be deleted. It is also possible to specify the deletion of encryption keys. For example, the offline data delete policy 18 may involve specifying everything in "My Documents", or specifying all files with certain file extensions, irrespective of location, or it may mean specifying everything except the operating system. It would in most cases also involve specifying whether a warning message is required, the primary delay before triggering the message, and the frequency of the message. Also to be specified is the secondary time period before which the pre-boot password is required, the pre-boot password itself and the number of attempts before data delete is triggered. The administrator may also optionally specify that a certain number of failed Windows® login attempts can also trigger data deletion.

After the offline data delete policy 18 has been defined, the administrator applies 65 the policy 18 to one or more host devices 10 covered by the customer's account, each host 10 being identified by a unique ESN and being shown on screen together with possibly an administrator defined name, a make and a model. After the host or hosts 10 to which the offline data delete policy 18 applies have been selected, the administrator confirms 66 the policy application, by accepting an online agreement and entering the SecurID. The offline data delete policy 18 and the ESN(s) of the hosts 10 to which it applies are stored 67 in the database 23 of the monitoring center 19. On viewing 68 the status for the host(s) 10 at the customer center 20, the administrator sees that the status for each host is "Set—Awaiting call".

When one of the hosts 10 to which the new offline data delete policy 18 is to be applied is connected to the internet, its agent 11 makes a call 69 to (or, in some embodiments, receives a call 69 from) the monitoring center. If the components of the offline data delete module 13 are not already installed in the host 10, they are downloaded from the monitoring center 19. The components include the trigger detection client 14, the trigger action client 15, the pre-boot password prompt client 16, the disable offline data delete utility 21, the clock utility 22 and the data delete client 17. The offline data delete policy 18 stored 70 in database 23 of the monitoring center 19 is also downloaded 71 to the offline data delete module 13 in the host 10, which from that point on monitors 72 for triggers that would ultimately require the data delete client 17 to delete files and/or folders in the host 10. The monitoring center 19 also updates 73 the customer center 20 as to the fact that the new policy 18 has been successfully downloaded to the host 10. On viewing 74 the status of the host(s) 10 at the customer center 20, the administrator sees that the status of the host 10 that just called in is "Monitoring Triggers".

Use-Case: Invalid Windows Login

The offline data delete system may be combined with a more conventional method of data deletion. For example, the administrator has the option to set up an offline data delete policy 18 defining that the data should be deleted after a predetermined number of failed Windows® login attempts. This is a trigger that can cause the data to be deleted irrespective of the combination of triggers disclosed herein.

Figure 4:
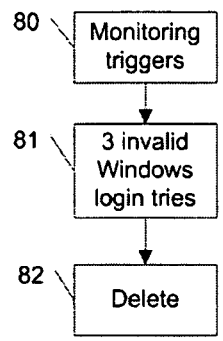
FIG. 4 is a use-case diagram showing deletion after invalid Windows® login in accordance with embodiments of the disclosed subject matter.

FIG. 4 shows the steps of the process undergone by a host 10 in this situation. The offline data delete policy 18 has been set beforehand to trigger data deletion following three invalid Windows® login attempts, and the offline data delete policy 18 has been successfully downloaded to the offline data delete module 13. The initial step 80 shows the offline data delete module 13 in the host 10 in a state of "Monitoring Triggers". In step 81, a thief attempts to guess a Windows® password, but makes three wrong tries. The trigger detection client 14 detects this and causes the trigger action client 15 to take action, which results in the data delete client 17 launching in the background 82. This more conventional method of data deletion is optional because some users do not wish to use a Windows® password. The number of attempts at entering a Windows® password can be set to another number if desired, such as 0, 1, 2, 4, 5 or more.

Use-Case: Disabling a Policy

Figure 5:
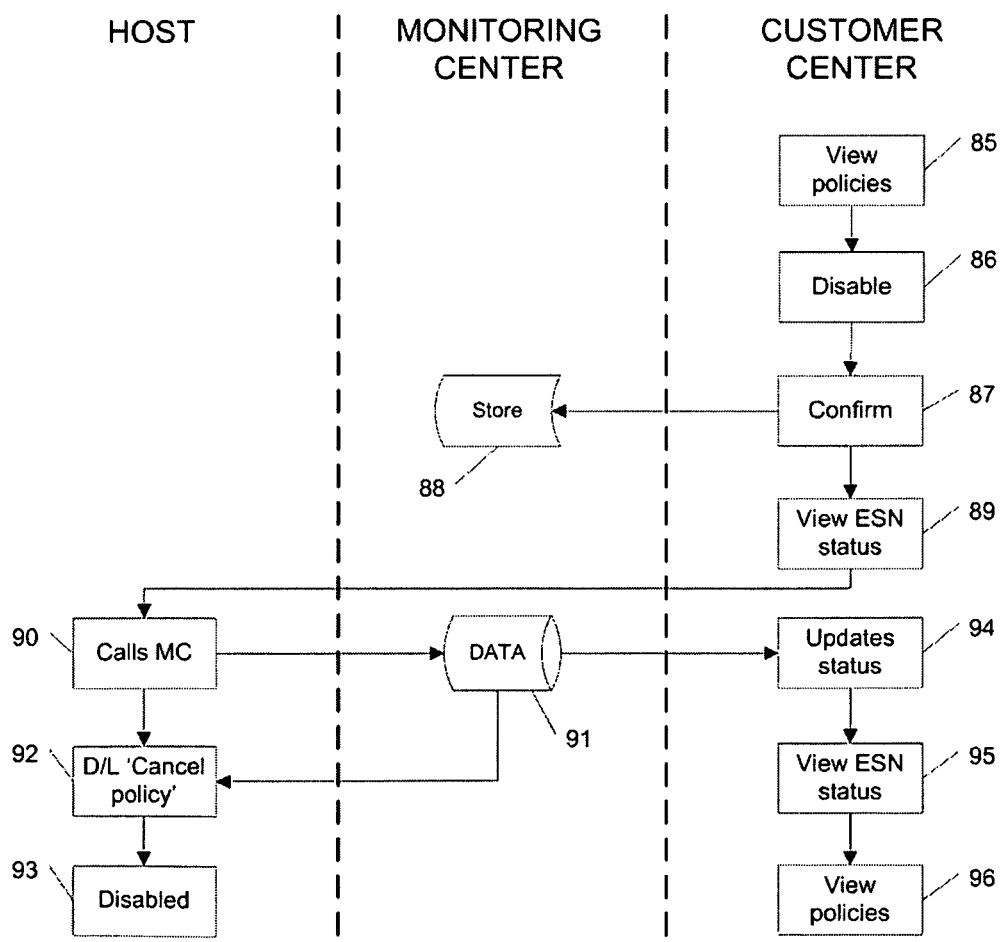
FIG. 5 is a use-case diagram showing the disablement of a data delete policy in accordance with embodiments of the disclosed subject matter.

FIG. 5 shows the steps taken when an administrator wants to disable an offline data delete policy 18. In step 85 an administrator logs onto the customer center 20 and views the existing policies 18. The administrator selects an existing offline data delete policy 18 and disables it 86. Following the disable request is a confirmation step 87 in which the administrator is prompted to sign an offline data delete agreement and enter the SecurID. The request to disable the data delete policy 18 is stored 88 in the database 23 of the monitoring center 19. The administrator then checks the status of the hosts 89, and sees that the status for all the hosts 10 that were covered by the offline data delete policy 18 that has just been disabled is "Disabled: Awaiting Call".

In time, one of the agents 11 in a host 10 for which the data delete policy 18 is to be disabled calls 90 the monitoring center 19. The data in memory 91 representing the disabling of the policy 18 is downloaded 92 from the monitoring center 19 to the host 10, where the trigger detection client 14 is stopped and uninstalled, the trigger action client 15 is uninstalled, the pre-boot password prompt client 16 is uninstalled, the disable offline data delete utility 21 is uninstalled, the offline data delete clock utility 22 is uninstalled, the data delete client 17 is uninstalled and its associated policy setup file is removed. The status of the host then becomes "Disabled" 93. Meanwhile, a record in memory 91 is made at the monitoring centre 19 that the data delete policy 18 in the host 10 has been disabled and the information at the customer centre 20 is updated 94.

If the administrator then views 95 the status of the hosts 10 that were covered by the policy 18 that was just cancelled, the customer centre 20 will show that the one host 10 which just called in now has a status of "Disabled", while all the other hosts 10 still have the status "Disabled: Awaiting Call". The administrator then views 96 the policies 18, selects the policy 18 that has just been cancelled and sees that the host 10 that just called in is no longer on the list for that policy.

It is possible to remove a single host 10 and a group of hosts from a policy 18. It is also possible to delete a policy 18 and have all hosts 10 to which it applied removed from it.

Use-Case: Interaction with an Online Delete Request

Figures 6, 9:
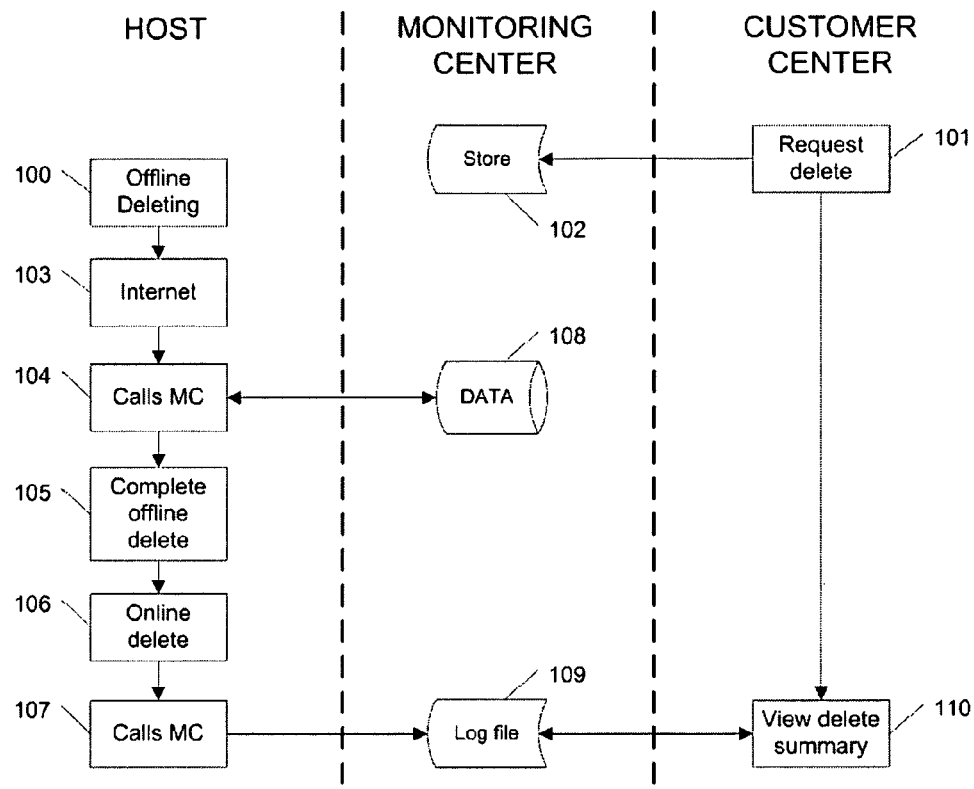
FIG. 6 is a use-case diagram showing interaction with an online data delete request in accordance with embodiments of the disclosed subject matter.
FIG. 9 is a screen shot showing data delete policy summaries in accordance with embodiments of the disclosed subject matter.

FIG. 6 shows how the offline data delete system interacts with an online data delete instruction that is provided to the host 10 via a later internet connection. In the illustrated case, the offline data delete module 13 has been triggered and is in a state 100 of deleting files from the host 10. Meanwhile, or prior to the triggering event, the administrator has become aware of the theft of the computer and has made an online data delete request 101 at the customer center. This kind of request 101 is only fulfilled during or after the host 10 is connected 40 to the internet, since the monitoring center 19 communicates the required instruction to the host 10 via the internet. Once the online data delete request 101 has been made, the request is stored 102 at the monitoring center.

During the offline data deletion, the thief in possession of the computer connects it to the internet 103, at which point the agent 11 in the host 10 calls 104 the monitoring center 19. Instructions in the data 108 at the monitoring center 19 are communicated to the agent 11 in the host 10. The agent 11 waits until the offline data deletion has been completed 105 and then commences the online data delete instruction 106. Both types of deletion are allowed to occur because they may delete different files. Both types also write the names of the files deleted to the same log file in the host 10. When the host 10 next calls 107 the monitoring center 19, the log file is uploaded 109. The administrator views 110 the data delete summary at the monitoring center 19. Whether it is the online or offline data delete summary that is viewed, the results are the same because the log file was shared.

It may happen that the offline data delete process has completed before the connection to the internet 103 is made. In this case, when the call 104 to the monitoring center 19 is made, the agent 11 again downloads the online data delete instruction 108, but also uploads the completed offline data delete log file. The online data delete process then occurs, creating another log file, which is uploaded at a later connection to the internet, or during the same internet connection if its duration is sufficient. When the administrator views the data delete summaries at the customer center 20, they may be different, because the online data delete request 101 could have resulted in the deletion of further files. The log file for the offline data delete process 100 includes only those files specified by the associated policy 18.

It may happen that the agent 11 calls in to monitoring center 19 while offline data delete 100 is running, but there is no online data delete request. In this case, the online data delete step 106 is omitted and the agent calls 107 the monitoring center 19 when the offline data delete 100 has been completed.

State Transition Diagrams

Figure 7:
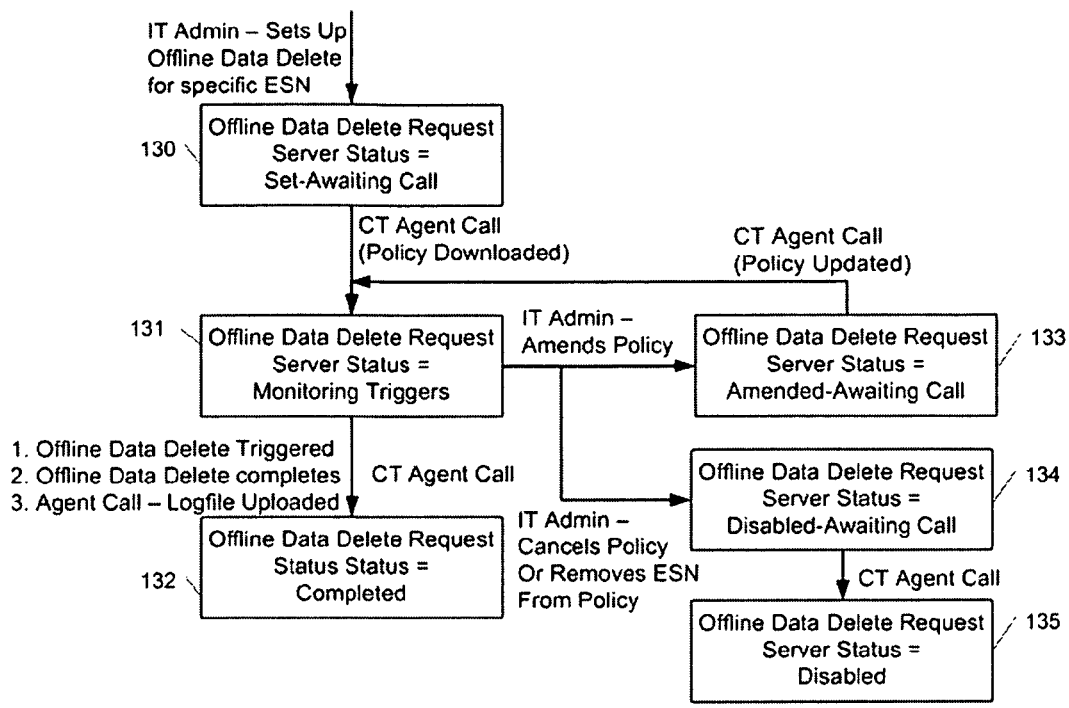
FIG. 7 is a state transition diagram for the monitoring center in accordance with embodiments of the disclosed subject matter.

FIG. 7 shows the state transition diagram for the monitoring center 19 of the offline data delete system in operation. Initially, the administrator sets up an offline data delete policy 18 for a specific host 10. The status of the monitoring center 19 is "Set: Awaiting Call" 130. The agent 11 then makes a call 40 to the monitoring center 19, the data delete policy 18 is downloaded, and the status becomes "Monitoring Triggers" 131. The offline data delete module 13 is then triggered, data is deleted 48 offline, a log file is created and sometime later the host 10 is again connected to the internet and the agent 11 makes a further call. Once the log file is uploaded, the status at the monitoring center becomes "Completed" 132. If, while the status is "Monitoring Triggers" 131, the administrator amends the policy 18, the monitoring center 19 status becomes "Amended: Awaiting Call" 133. At the next agent 11 call, the amended policy 18 is downloaded and the status at the monitoring center 19 becomes "Monitoring Triggers" 131. If, while the status is "Monitoring Triggers" 131, the administrator cancels the policy 18 or removes the specific host 10 from the policy 18, the monitoring center 19 status becomes "Disabled: Awaiting Call" 134. At the next agent 11 call, the policy 18 locally stored in the host 10 is deleted or disabled and the status as seen at the monitoring center 19 becomes "Disabled" 135.

Figure 8:
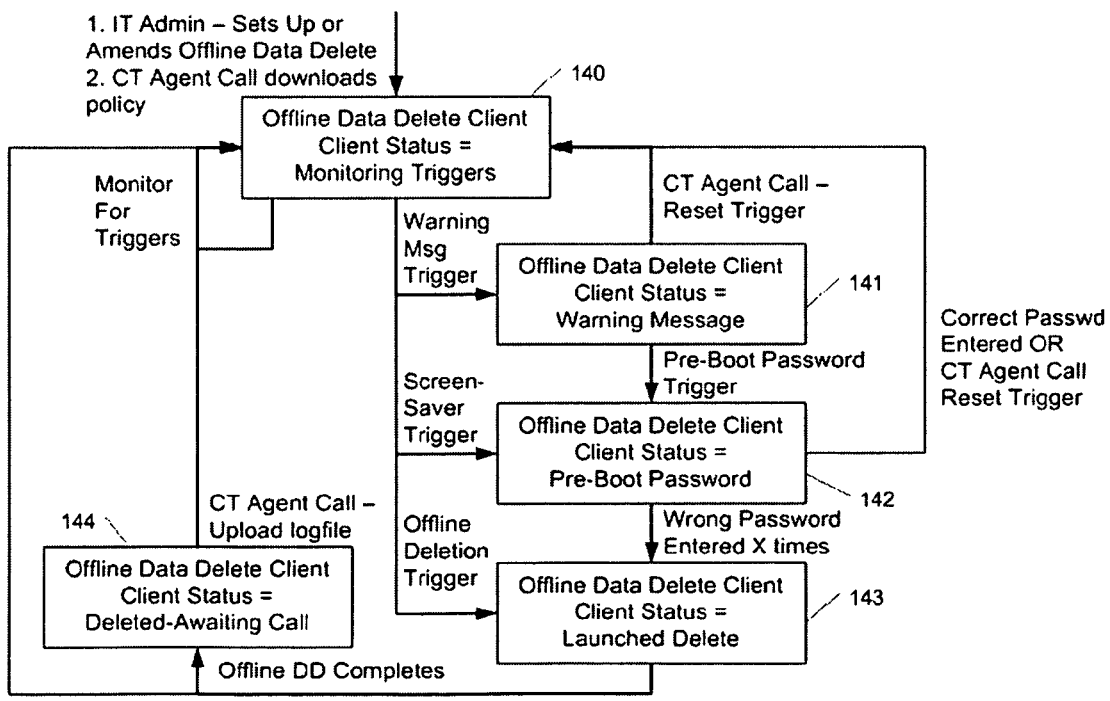
FIG. 8 is a state transition diagram for the data delete module in a host in accordance with embodiments of the disclosed subject matter.

FIG. 8 shows the state transition diagram for the host 10, or "client" as it is referred to in the diagram. Initially, the administrator sets up or amends the offline data delete policy 18, and the agent 11 calls in to the monitoring center 19 and downloads the policy 18. The status of the client becomes "Monitoring Triggers" 140. If an initial time period expires without the agent 11 calling in again, the client status becomes "Warning Message" 141, and warning messages are displayed 43 on the client 10. If a secondary time period passes without the agent 11 calling in, the client moves into the "Pre-Boot Password" status 142. If the wrong password is entered too many times, the offline data deletion is launched and the status becomes "Launched Delete" 143. Following completion of the data deletion, the status becomes "Deleted: Awaiting Call" 144. On subsequent internet connection and agent 11 call in to the monitoring center 19, the log file is uploaded to the monitoring center 19 and the status returns to "Monitoring Triggers" 140. If, during the pre-boot password status 142, the correct password is entered or the agent 11 calls in, the client status returns to "Monitoring Triggers" 140.

Screen Shots

FIG. 9 shows an example screen shot relating to policy management. There are two policies 18 illustrated in the example—one for the sales PC's 153 and one for the Marketing PC's 154. There is an edit policy button 151 for changing the sales PC's, and another edit policy button 152 for changing the marketing PC's policy. A further button 150 is for creating a new policy.

FIG. 10 shows an example of a screen for data delete policy set-up and management. In this example, the screen is divided into three steps. Step one 170 is the definition of the policy 18, step two 178 is the application of the policy 18 to a set of hosts 10, and step three 180 is the authorization step.

In the first step 170, in the policy name 171 line, a policy name 171 and description 181 can be entered between the corresponding square brackets. The administrator selects 172 whether the lack of an internet connection for a certain duration counts as a trigger. The administrator selects whether or not a coded warning message should be displayed 173 after a certain number of days without an internet connection. In this example the number of days has been chosen to be 7 as shown in the corresponding square brackets. The message that is displayed is shown 182 and can be edited if desired.

The administrator selects whether the user should be locked out with a pre-boot password 174 according to the claimed subject matter or, optionally, whether data delete should be launched without the need for incorrect password entry 175 according to a more conventional method of data protection. In this case, and according to the claimed subject matter, a pre-boot password has been selected, to be required after 9 days without an internet connection. The prompt 183 for the pre-boot password, the password itself 184 and the number of allowed attempts 185 can be chosen by the administrator.

The administrator can also select 176 whether an invalid Windows® login will trigger the offline data delete, and the number of permitted attempts. In this case the number of attempts has been chosen to be 5.

The type of data to be deleted is chosen 177 in this example to be all files except the operating system or specific files and/or folders. The administrator can also choose 186 whether the local disable utility 21 is to be downloaded to the host 10 and can also select the password for its activation in this area.

In step two 178, the policy 18 is applied to a computer or group of hosts 10. The buttons on line 179 allow for adding a host 10, adding a host 10 group or removing a policy 18 from one or more hosts 10. The status of each host 10 to which the policy 18 applies is also shown, as well as the date and time of the last communication 40. Note that selecting and/or deselecting hosts 10 in this step is for informational purposes only and the actual updates occur in the following step.

Step three 180 is the authorization step. Shown in this part of the screen is an agreement that must be accepted 181 by the administrator and an area 187 for entering the administrator's details. Finally, the row of buttons 188 allows the administrator to save & apply, cancel or disable the policy 18.

FIG. 11 shows an example screen shot of the Data Delete Summary screen, in which a status summary for a group of hosts 10 can be seen. The hosts 10 selected to be seen are chosen by selecting the required parameters in the Filter column 160. For example, all hosts 10 can be seen (all ESN's) or only those with a particular make. In this example it is Dell™. Other parameters can be used, such as date-dependent parameters. The hosts 10 can be further filtered by their status in column 161, by selecting or deselecting the appropriate check boxes. If the offline data delete system is combined with an online data delete system, the hosts 10 can be selected according to which type of deletion status is desired to be seen.

After clicking the Show Results button 165, the lower portion of the screen appears where the summary results are seen. The hosts 10 are listed according to their ESN in column 166, with additional details pertaining to each host 10 running along the rows. In column 163, the name of the policy 18 covering each host 10 is named (offline policies only) and in column 168 the latest status recorded at the monitoring center 19 can be seen for each host 10. Here, for example, one host 10 is monitoring for triggers and the other needs to call in 40 so that the policy 18 can be downloaded and set in the host 10. Further detail can be seen for each by clicking on a detail button 167.

FIG. 12 shows an example of a data delete detail screen for a selected host, here identified as computer 201. The name 202 of the policy 18 is shown as well as the types and setting of the triggers. In this case, the trigger policy comprises lack of internet connection 203, coded warning message 204, user lockout with pre-boot password required 205 and invalid Windows® login 206. It shows the data delete type 207, the corresponding file/folder policy name 208 and the list of files/folders to be deleted 209. Line 210 shows whether the host 10 has the local disable utility. The name and details 211 of the administrator who authorized the data delete are also shown.

The data delete status 212 is shown in the lower section of the screen. A chronological history of the status is shown. In this example, the offline policy was set at the customer center on May 3, 2007 at 14:15. The host 10 was connected 40 to the internet and the agent 11 called the monitoring center 19 later that day, allowing the policy 18 to be downloaded to the host by 18:23. The policy 18 was amended on May 12 and downloaded to the host 10 on May 13. Some time after this, the host 10 was stolen, the triggers 15 activated and the data deleted according to the policy 18, resulting in the completed status being reported to the monitoring center 19 on July 5. On clicking button 214 the log file of deleted files will be displayed.

ALTERNATIVES AND VARIATIONS

Wherever a password is required, a challenge/response question may be used instead. The user may also be given the choice of the two. It is also conceivable that a token may be used instead.

When the offline data delete module 13 is downloaded, it can be left in a dormant state with a facility for a legitimate end user to run a utility to activate it. On the first run a password or challenge/response is entered by the user to be used for future management. The user has an option to suspend or restart the offline data delete module 13, and also to force an agent 11 call 40.

The temporary disable utility could also have a permanent disable option.

A further trigger can be added to the existing triggers. This may be a measure of the time a host has been switched on since the last agent call. Depending on the particular configuration, the time measured may or may not include time in standby mode and/or time in hibernation mode.

The present description is of the best presently contemplated mode of carrying out the subject matter disclosed and claimed herein. The description is made for the purpose of illustrating the general principles of the subject matter and not be taken in a limiting sense; the claimed subject matter can find utility in a variety of implementations without departing from the scope and spirit of the invention made, as will be apparent to those of skill in the art from an understanding of the principles that underlie the invention. The scope of the invention is best determined with reference to the appended claims.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for protecting data stored on an electronic device from access by an illegitimate user, the method comprising:
    establishing a first communication between an agent installed in the electronic device and a remote server;
    subsequently, determining that a second communication has not been established between the agent and the remote server within a predetermined period of time for establishing a communication between the agent and the remote server;
    in response to determining that the second communication has not been established within the predetermined period of time, displaying a password prompt;
    waiting until entry of a password by a user in response to the password prompt;
    detecting said entry of the password; and
    subsequently, processing the entry of the password by a process that comprises:
        if the password is valid, setting a timer to measure a further predetermined period of time for establishing the second communication between the agent and the remote server;
        if the password is not valid, determining whether a threshold number of invalid password entry attempts have occurred in response to the password prompt, the threshold being greater than one; and
        if the threshold number of invalid password entry attempts is reached, executing a data protection policy that causes data on the electronic device to be protected, wherein the data protection policy is executed only if the threshold number of invalid password entry attempts is reached, after and not during said waiting.

2. The method of claim 1 further comprising, in response to determining that the second communication has not been established within the predetermined period of time, executing a boot sequence that reboots the electronic device and causes the electronic device to, prior to completion of rebooting, display the password prompt, wherein the electronic device does not finish rebooting unless a valid password is entered in response to the password prompt.

3. The method of claim 2, wherein the process further comprises, if the password is valid, causing the electronic device to finish rebooting.

4. The method of claim 1 further comprising allowing otherwise normal operation of the electronic device while deleting the data stored on the electronic device.

5. The method of claim 1 further comprising writing identification information for the data to a log file and subsequently uploading the log file to the server from the electronic device.

6. The method of claim 1 wherein executing the data protection policy comprises deleting said data from the electronic device.

7. The method of claim 6 further comprising continuing deletion of the data if the deletion is interrupted by shutting down or rebooting the electronic device.

8. An electronic device comprising a memory for the storage of data, an output interface, an input interface, an agent, and an offline data protection module, wherein the agent is configured to communicate with a remote server and the offline data protection module is configured to:
    establish a first communication between an agent installed in the electronic device and a remote server;
    subsequently, determine that a second communication has not been established between the agent and the remote server within a predetermined period of time for establishing a communication between the agent and the remote server;
    in response to determining that the second communication has not been established within the predetermined period of time, display a password prompt;
    wait until entry of a password by a user in response to the password prompt;
    detect said entry of the password; and
    subsequently, process the entry of the password by a process that comprises:
        if the password is valid, setting a timer to measure a further predetermined period of time for establishing the second communication between the agent and the remote server;
        if the password is not valid, determining whether a threshold number of invalid password entry attempts have occurred in response to the password prompt, the threshold being greater than one; and
        if the threshold number of invalid password entry attempts is reached, executing a data protection policy that causes data on the electronic device to be protected, wherein the data protection policy is executed only if the threshold number of invalid password entry attempts is reached, after and not during said waiting.

9. The electronic device of claim 8, wherein the offline data protection module is further configured to, in response to determining that the second communication has not been established within the predetermined period of time, execute a boot sequence that reboots the electronic device and causes the electronic device to, prior to completion of rebooting, display the password prompt, wherein the electronic device does not finish rebooting unless a valid password is entered in response to the password prompt.

10. The electronic device of claim 9, wherein the process further comprises, if the password is valid, causing the electronic device to finish rebooting.

11. The electronic device of claim 8, wherein the offline data protection module is further configured to allow otherwise normal operation of the electronic device while deleting the at least some data stored on the electronic device.

12. The electronic device of claim 8, wherein the offline data protection module is further configured to write identification information for the at least some data to a log file and upload the log file to the remote server.

13. The electronic device of claim 8, wherein executing the data protection policy comprises deleting said data from the electronic device.

14. The electronic device of claim 13, wherein the offline data protection module is further configured to continue deletion of the at least some data if the deletion is interrupted by shutting down or rebooting the electronic device.

15. The electronic device of claim 13, wherein the offline data protection module is incapable of deleting said data unless both (1) the second communication is not established between the agent and the remote server within the predetermined period of time, and (2) an incorrect password is entered in connection with the password prompt.

16. A non-transitory computer-readable medium carrying computer-executable instructions which, when executed on an electronic device comprising a processor and a memory, the memory storing data to be protected from unauthorized access, carry out a method comprising:
  establishing a first communication between an agent on the electronic device and a remote server;
  outputting to a user a request for a password if a second communication is not established between the agent and the remote server within a predetermined period of time for establishing a communication between the agent and the remote server;
  waiting for the user to enter a password in response to the request;
  detecting user entry of a password in response to the request; and
  subsequently, processing the entry of the password by a process that comprises:
    if the password is valid, setting a timer to measure a further predetermined period of time for establishing the second communication between the agent and the remote server;
    if the password is not valid, determining whether a threshold number of invalid password entry attempts have occurred in connection with the request, the threshold being greater than one; and
    if the threshold number of invalid password entry attempts is reached, executing a data protection policy that causes data on the electronic device to be protected, wherein the data protection policy is executed only if the threshold number of invalid password entry attempts is reached, after and not during said waiting.

17. A non-transitory computer-readable medium having stored thereon executable code that directs an electronic device to perform a method that comprises:
  determining that the electronic device has failed to communicate with a designated remote system for a predetermined period of time;
  displaying, in connection with said failure to communicate for the predetermined period of time, a prompt for user entry of authentication information; and
  waiting until entry of authentication information by a user in response to the prompt;
  detecting said entry of the authentication information; and
  subsequently, processing the entry of the authentication information by a process that comprises:
    if the authentication information is valid, setting a timer to measure a further predetermined period of time for establishing the communication between the electronic device and the remote server;
    if the authentication information is not valid, determining whether a threshold number of invalid authentication information entry attempts have occurred in response to the prompt, the threshold being greater than one; and
    if the threshold number of invalid authentication information entry attempts is reached, executing a data protection policy that causes data on the electronic device to be protected, wherein the data protection policy is executed only if the threshold number of invalid authentication information entry attempts is reached, after and not during said waiting.

18. The non-transitory computer-readable medium of claim 17, wherein the method further comprises, in response to determining that the second communication has not been established within the predetermined period of time, executing a boot sequence that reboots the electronic device and causes the electronic device to, prior to completion of rebooting, display the prompt, wherein the electronic device does not finish rebooting unless valid authentication information is entered in response to the prompt.

19. The non-transitory computer-readable medium of claim 18, wherein the process further comprises, if the authentication information is valid, causing the electronic device to finish rebooting.

* * * * *